United States Patent
Arora et al.

(10) Patent No.: US 10,839,397 B2
(45) Date of Patent: Nov. 17, 2020

(54) METHOD AND SYSTEM FOR CONTEXTUAL DEVICE AUTHENTICATION VIA BLOCKCHAIN

(71) Applicant: MASTERCARD INTERNATIONAL INCORPORATED, Purchase, NY (US)

(72) Inventors: Ankur Arora, New Delhi (IN); Amit Gupta, New Delhi (IN); Shreya Mittal, Delhi (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 86 days.

(21) Appl. No.: 16/123,460

(22) Filed: Sep. 6, 2018

(65) Prior Publication Data
US 2020/0082401 A1   Mar. 12, 2020

(51) Int. Cl.
| | |
|---|---|
| G06Q 20/32 | (2012.01) |
| G06Q 20/38 | (2012.01) |
| G06Q 20/40 | (2012.01) |
| H04L 29/08 | (2006.01) |
| H04L 9/06 | (2006.01) |
| H04L 9/32 | (2006.01) |

(52) U.S. Cl.
CPC ....... *G06Q 20/405* (2013.01); *G06Q 20/3224* (2013.01); *G06Q 20/382* (2013.01); *H04L 9/0637* (2013.01); *H04L 9/3297* (2013.01); *H04L 67/306* (2013.01); *H04L 2209/38* (2013.01); *H04L 2209/56* (2013.01)

(58) Field of Classification Search
CPC .................................................. G06Q 20/405
See application file for complete search history.

(56) References Cited

U.S. PATENT DOCUMENTS

| | | | | |
|---|---|---|---|---|
| 2013/0197998 | A1* | 8/2013 | Buhrmann | G06Q 20/4016 705/14.53 |
| 2017/0132626 | A1* | 5/2017 | Kennedy | G06Q 20/401 |
| 2018/0075527 | A1* | 3/2018 | Nagla | G06F 21/6218 |
| 2019/0066119 | A1* | 2/2019 | Sengupta | G06Q 30/018 |
| 2020/0007333 | A1* | 1/2020 | Young | H04L 9/3213 |

OTHER PUBLICATIONS

Raju et al., 2017, "Identity Management using Blockchain for Cognitive Cellular Networks" from IEEE ICC 2017 Communication and Information Systems Security Symposium (Year: 2017).*

* cited by examiner

*Primary Examiner* — Olabode Akintola
*Assistant Examiner* — Brandon M Duck
(74) *Attorney, Agent, or Firm* — Buchanan Ingersoll & Rooney PC

(57) ABSTRACT

A method for contextual authentication based on computing devices includes: storing an account profile related to a transaction account including an account identifier and a timestamp and a device geolocation for at least two computing devices; receiving an authorization request for a payment transaction including the account identifier, a transaction geographic location, and a transaction time; identifying an authentication score for the payment transaction based on a comparison of the transaction time and transaction geographic location to the timestamp and device geographic location for each of the at least two computing devices; and transmitting the identified authentication score and received authorization request to a financial institution associated with the transaction account.

16 Claims, 6 Drawing Sheets

METHOD AND SYSTEM FOR CONTEXTUAL DEVICE AUTHENTICATION VIA BLOCKCHAIN

FIELD

The present disclosure relates to the contextual authentication of transactions based on the geographic location of multiple computing devices, specifically the use of geolocation information on a plurality of computing devices associated with a transaction account for stronger authorization of a transaction where the geolocation information can be stored on a blockchain for even greater security.

BACKGROUND

Consumers use payment instruments to pay for electronic payment transactions billions of times every single day. However, with increased usage of these payment instruments, such as credit cards, there is also an increase in the amount of fraud that is perpetrated, particularly through theft of the payment instrument. A common method used to try and combat theft is to require additional authentication of the user of the payment instrument. One such method that has arisen is the use of the geographic location of a computing device, such as a smart phone, registered to an authorized user of a payment instrument. The geographic location of the computing device is pinged when a transaction is attempted, or the computing device's most recent geographic location logged and recalled when the transaction is attempted. Its location is compared to the location of the transaction to determine if the transaction should be authorized, where a difference in the location implies that the authorized user is not present and thus that the payment instrument was stolen. The transaction can then be declined, and sometimes use of the payment instrument frozen entirely, out of concern for fraud.

With such methods, theft of the payment instrument or smart phone separately will leave the consumer's account protected. However, with the rise of electronic wallets, many consumers are now using their smart phone as their payment instrument. In such cases, theft of the smart phone results in theft of both the payment instrument and the device used for geolocation, enabling a fraudster to use the transaction account as they please with full authorization of all transactions. Thus, there is a need for a system that uses at least one additional layer of security in the authorization of a payment transaction to prevent the ability of a fraudster to conduct unauthorized transactions if a combined payment instrument and authentication device is stolen.

SUMMARY

The present disclosure provides a description of systems and methods for contextual authentication based on computing devices that enable a technical solution to this problem. A centralized processing server keeps track of the geographic location of multiple user computing devices, such as keeping track of a consumer's smart phone, smart watch, and activity tracker. When a payment transaction is attempted, the processing server compares the time and location of the transaction with the latest time and location for all of the consumer's devices, identifying a score or gating processing of the transaction based thereon. The location of all of the devices is taken into account, such that the theft of one can prevent the transaction entirely, and requiring that all of the devices be stolen and in possession of the fraudster at the time of a transaction to not have an immediate decline. In some embodiments, a blockchain is used for storage of device location information. In these embodiments, the geographic location information, and the general association of a computing device with a transaction account, is stored in an immutable record to prevent a fraudster from being able to fake a device's geographic location, and also prevent an authorized consumer from contesting a genuine transaction. The result is greater security against fraud and misuse by authorized consumers, without requiring consumers to do anything more than they already do when conducting payment transactions.

A method for contextual authentication based on computing devices includes: storing, in an account database of a processing server, an account profile, wherein the account profile includes data related to a transaction account including at least an account identifier and, for at least two computing devices associated with the related transaction account, at least a timestamp and a device geographic location of the respective computing device at the timestamp; receiving, by a receiver of the processing server, an authorization request for a payment transaction, wherein the authorization request is formatted according to one or more standards and includes a plurality of data elements including at least a first data element configured to store the account identifier, a second data element configured to store a transaction geographic location, and a third data element configured to store a transaction time; identifying, by the processing server, an authentication score for the payment transaction based on at least a comparison of the transaction time and transaction geographic location to the timestamp and device geographic location included in the account profile for each of the at least two computing devices; and electronically transmitting, by a transmitter of the processing server, the identified authentication score and received authorization request to a financial institution associated with the transaction account.

Another method for contextual authentication based on computing devices includes: storing, in an account database of a processing server, an account profile, wherein the account profile includes data related to a transaction account including at least an account identifier and, for at least two computing devices associated with the related transaction account, at least a timestamp and a device geographic location of the respective computing device at the timestamp; receiving, by a receiver of the processing server, an authorization request for a payment transaction, wherein the authorization request is formatted according to one or more standards and includes a plurality of data elements including at least a first data element configured to store the account identifier, a second data element configured to store a transaction geographic location, and a third data element configured to store a transaction time; identifying, by the processing server, an authentication score for the payment transaction based on at least a comparison of the transaction time and transaction geographic location to the timestamp and device geographic location included in the account profile for each of the at least two computing devices; determining, by the processing server, if the payment transaction should be declined based on a comparison of the identified authentication score to a threshold level; and if the determination is successful, electronically transmitting, by a transmitter of the processing server, an authorization response for the payment transaction to a third party, wherein the authorization response is formatted according to the one or more standards and includes a plurality of data elements including at least a first data element configured to store the account identifier and a second data element configured to store a response code indicating decline of the payment transaction, or if the determination is unsuccessful, electronically transmitting, by the transmitter of the processing server, the identified authentication score and received authorization request to a financial institution associated with the transaction account.

A system for contextual authentication based on computing devices includes: an account database of a processing server configured to store an account profile, wherein the account profile includes data related to a transaction account including at least an account identifier and, for at least two computing devices associated with the related transaction account, at least a timestamp and a device geographic location of the respective computing device at the timestamp; a receiver of the processing server configured to receive an authorization request for a payment transaction, wherein the authorization request is formatted according to one or more standards and includes a plurality of data elements including at least a first data element configured to store the account identifier, a second data element configured to store a transaction geographic location, and a third data element configured to store a transaction time; the processing server configured to identify an authentication score for the payment transaction based on at least a comparison of the transaction time and transaction geographic location to the timestamp and device geographic location included in the account profile for each of the at least two computing devices; and a transmitter of the processing server configured to electronically transmit the identified authentication score and received authorization request to a financial institution associated with the transaction account.

Another system for contextual authentication based on computing devices includes: an account database of a processing server configured to store an account profile, wherein the account profile includes data related to a transaction account including at least an account identifier and, for at least two computing devices associated with the related transaction account, at least a timestamp and a device geographic location of the respective computing device at the timestamp; a receiver of the processing server configured to receive an authorization request for a payment transaction, wherein the authorization request is formatted according to one or more standards and includes a plurality of data elements including at least a first data element configured to store the account identifier, a second data element configured to store a transaction geographic location, and a third data element configured to store a transaction time; the processing server configured to identify an authentication score for the payment transaction based on at least a comparison of the transaction time and transaction geographic location to the timestamp and device geographic location included in the account profile for each of the at least two computing devices, and determine if the payment transaction should be declined based on a comparison of the identified authentication score to a threshold level; and a transmitter of the processing server configured to if the determination is successful, electronically transmit an authorization response for the payment transaction to a third party, wherein the authorization response is formatted according to the one or more standards and includes a plurality of data elements including at least a first data element configured to store the account identifier and a second data element configured to store a response code indicating decline of the payment transaction, or if the determination is unsuccessful, electronically transmit the identified authentication score and received authorization request to a financial institution associated with the transaction account.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Figure 1A:
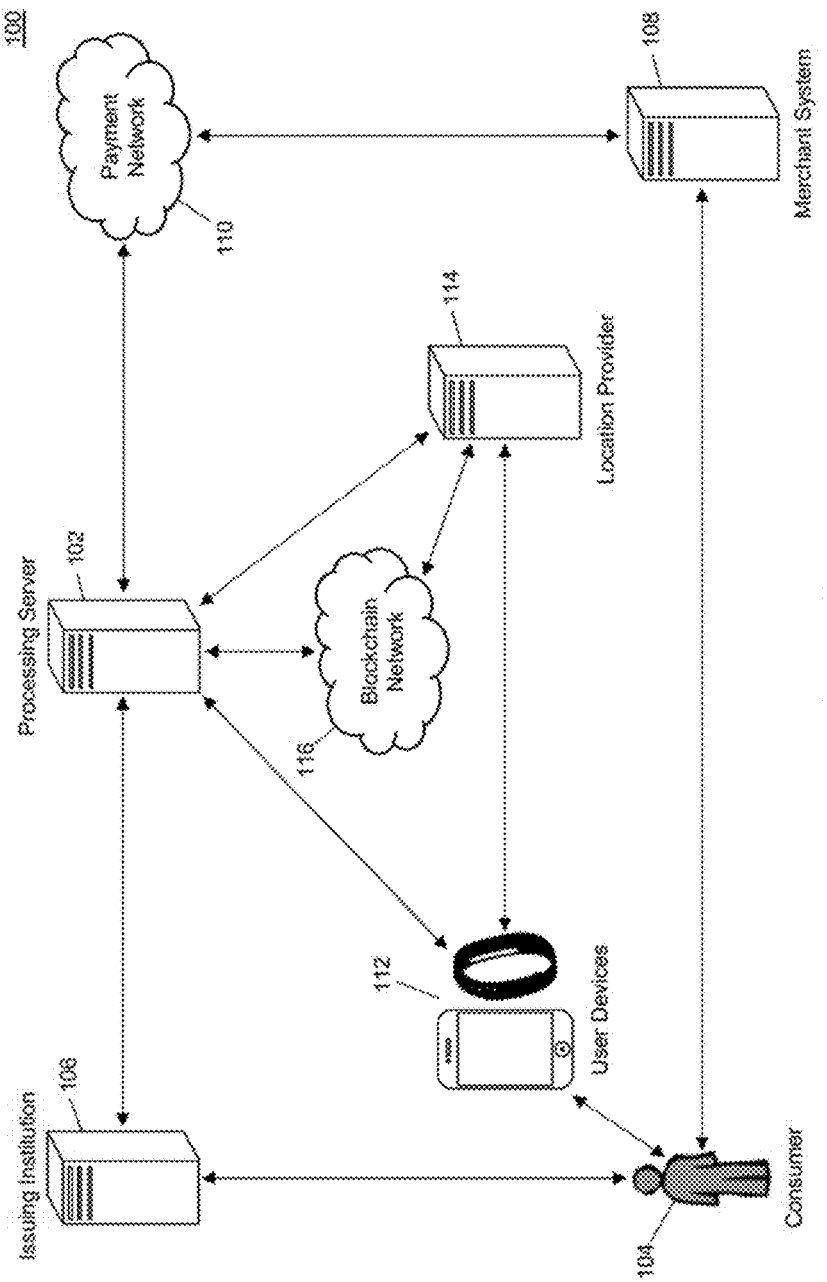
FIG. 1A is a block diagram illustrating a high level system architecture for the contextual authentication of payment transactions based on computing device geolocation in accordance with exemplary embodiments.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Blockchain—A public ledger of all transactions of a blockchain-based currency. One or more computing devices may comprise a blockchain network, which may be configured to process and record transactions as part of a block in the blockchain. Once a block is completed, the block is added to the blockchain and the transaction record thereby updated. In many instances, the blockchain may be a ledger of transactions in chronological order, or may be presented in any other order that may be suitable for use by the blockchain network. In some configurations, transactions recorded in the blockchain may include a destination address and a currency amount, such that the blockchain records how much currency is attributable to a specific address. In some instances, the transactions are financial and others not financial, or might include additional or different information, such as a source address, timestamp, etc. In some embodiments, a blockchain may also or alternatively include nearly any type of data as a form of transaction that is or needs to be placed in a distributed database that maintains a continuously growing list of data records hardened against tampering and revision, even by its operators, and may be confirmed and validated by the blockchain network through proof of work and/or any other suitable verification techniques associated therewith. In some cases, data regarding a given transaction may further include additional data that is not directly part of the transaction appended to transaction data. In some instances, the inclusion of such data in a blockchain may constitute a transaction. In such instances, a blockchain may not be directly associated with a specific digital, virtual, fiat, or other type of currency.

Payment Network—A system or network used for the transfer of money via the use of cash-substitutes for thousands, millions, and even billions of transactions during a given period. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, transaction accounts, etc. Examples of networks or systems configured to perform as payment networks include those operated by MasterCard®, VISA®, Discover®, American Express®, PayPal®, etc. Use of the term "payment network" herein may refer to both the payment network as an entity, and the physical payment network, such as the equipment, hardware, and software comprising the payment network.

Payment Rails—Infrastructure associated with a payment network used in the processing of payment transactions and the communication of transaction messages and other similar data between the payment network and other entities interconnected with the payment network that handles thousands, millions, and even billions of transactions during a given period. The payment rails may be comprised of the hardware used to establish the payment network and the interconnections between the payment network and other associated entities, such as financial institutions, gateway processors, etc. In some instances, payment rails may also be affected by software, such as via special programming of the communication hardware and devices that comprise the payment rails. For example, the payment rails may include specifically configured computing devices that are specially configured for the routing of transaction messages, which may be specially formatted data messages that are electronically transmitted via the payment rails, as discussed in more detail below.

Issuer—An entity that establishes (e.g., opens) a letter or line of credit in favor of a beneficiary, and honors drafts drawn by the beneficiary against the amount specified in the letter or line of credit. In many instances, the issuer may be a bank or other financial institution authorized to open lines of credit. In some instances, any entity that may extend a line of credit to a beneficiary may be considered an issuer. The line of credit opened by the issuer may be represented in the form of a payment account, and may be drawn on by the beneficiary via the use of a payment card. An issuer may also offer additional types of payment accounts to consumers as will be apparent to persons having skill in the relevant art, such as debit accounts, prepaid accounts, electronic wallet accounts, savings accounts, checking accounts, etc., and may provide consumers with physical or non-physical means for accessing and/or utilizing such an account, such as debit cards, prepaid cards, automated teller machine cards, electronic wallets, checks, etc.

Transaction Account—A financial account that may be used to fund a transaction, such as a checking account, savings account, credit account, virtual payment account, etc. A transaction account may be associated with a consumer, which may be any suitable type of entity associated with a payment account, which may include a person, family, company, corporation, governmental entity, etc. In some instances, a transaction account may be virtual, such as those accounts operated by PayPal®, etc.

Payment Transaction—A transaction between two entities in which money or other financial benefit is exchanged from one entity to the other. The payment transaction may be a transfer of funds, for the purchase of goods or services, for the repayment of debt, or for any other exchange of financial benefit as will be apparent to persons having skill in the relevant art. In some instances, payment transaction may refer to transactions funded via a payment card and/or payment account, such as credit card transactions. Such payment transactions may be processed via an issuer, payment network, and acquirer. The process for processing such a payment transaction may include at least one of authorization, batching, clearing, settlement, and funding. Authorization may include the furnishing of payment details by the consumer to a merchant, the submitting of transaction details (e.g., including the payment details) from the merchant to their acquirer, and the verification of payment details with the issuer of the consumer's payment account used to fund the transaction. Batching may refer to the storing of an authorized transaction in a batch with other authorized transactions for distribution to an acquirer. Clearing may include the sending of batched transactions from the acquirer to a payment network for processing. Settlement may include the debiting of the issuer by the payment network for transactions involving beneficiaries of the issuer. In some instances, the issuer may pay the acquirer via the payment network. In other instances, the issuer may pay the acquirer directly. Funding may include payment to the merchant from the acquirer for the payment transactions that have been cleared and settled. It will be apparent to persons having skill in the relevant art that the order and/or categorization of the steps discussed above performed as part of payment transaction processing.

System for Device-Based Contextual Authentication of Transactions

FIG. 1A illustrates a system 100 for the contextual authentication of an electronic payment transaction based on geolocation of the payment transaction as well as the geolocation of multiple computing devices associated with a transaction account being used to fund the attempted payment transaction.

The system 100 may include a processing server 102. The processing server 102, discussed in more detail below, may be configured to assist in the authentication of an electronic payment transaction involving a consumer 104. In the system 100, an issuing institution 106 may issue a transaction account to the consumer 104 for use in funding an electronic payment transaction. The issuing institution 106 may be a financial institution, such as an issuing bank, or any other entity configured to issue transaction accounts for use in funding electronic payment transactions. As part of the issuing of the transaction account to the consumer 104, the issuing institution 106 may provide the consumer 104 with a payment instrument for use in conveying payment credentials associated with the transaction account for use in an electronic payment transaction. The payment instrument may be a physical instrument (e.g., a plastic credit card, a paper check, etc.) or digital instrument, such as payment credentials provisioned to a user device 112 that is used to electronically transmit the payment credentials to a merchant system 108 as part of a payment transaction. For example, the issuing institution 106 may transmit the payment credentials to a smart phone of the consumer 104 for storage therein and use by an electronic wallet application program thereon.

As part of the system 100, the consumer 104 (e.g., or the issuing institution 106 on behalf of the consumer 104) may register with the processing server 102 for use of the contextual authentication discussed herein. As part of the registration, the processing server 102 may be provided with at least an account identifier unique to the transaction account issued to the consumer 104 and a device identifier unique to each of a plurality of user devices 112. The account identifier may be the primary account number for the issued transaction account or any other identifying data that may be included in a transaction message used in the processing of the payment transaction, as discussed below. The device identifier for each user device 112 may be any value or combination of values unique to the respective user device 112, such as a media access control address, telephone number, internet protocol address, device identification number, registration number, serial number, etc.

The user devices 112 may be computing devices that must be located on or around the consumer 104 at the time of a payment transaction to ensure positive authentication of the payment transaction. In some cases, the user devices 112 may include a computing device that operates as a payment instrument for the payment transaction. In other cases, the payment instrument may be separate from the user devices 112. In some instances, a user device 112 that operates as a payment instrument may have its geolocation used for contextual authentication only for transactions where it is not also used as a payment instrument. User devices 112 may be any type of computing device whose geographic location is identifiable, such as a cellular phone, smart phone, smart watch, wearable computing device, implantable computing device, tablet computing device, etc.

In the system 100, the consumer 104 may initiate an electronic payment transaction by providing the payment credentials for the issued transaction account to a merchant system 108 (e.g., via a point of sale device thereof). The payment credentials may be transmitted to the merchant system 108 using any suitable method, such as the reading of a magnetic stripe, electronic transmission by near field communication or Bluetooth, the display of a machine-readable code by a user device 112 that is read by the merchant system 108, etc. The payment credentials may include at least the primary account number or other account identifier unique to the transaction account. The merchant system 108 may receive the payment credentials as well as other transaction data for the payment transaction, such as a transaction amount, product data, shipping information, etc. The transaction data, including the payment credentials, may be submitted to a payment network 110 for processing of the electronic payment transaction.

In some embodiments, the merchant system 108 may directly submit the transaction data to the payment network 110. In other embodiments, the transaction data may be transmitted to the payment network 110 through one or more intermediate entities, such as an acquiring institution and/or a gateway processor. The payment network 110 may receive the transaction data via payment rails associated therewith, where the transaction data may be included in a transaction message. The transaction message may be a specially formatted data message that is formatted according to one or more standards governing the interchange of financial transaction messages, such as the International Organization of Standardization's ISO 8583 or ISO 20022 standards. In some cases, the merchant system 108 may generate the transaction message. In other cases, the merchant system 108 may provide the transaction data to an intermediate entity (e.g., an acquiring institution) that may generate the transaction message for submission to the payment network 110.

The transaction message may include a plurality of data elements, where each data element is configured to store transaction data, such as set forth in the applicable standard(s). Transaction data may include the payment credentials, a transaction time, geographic location (e.g., of the merchant system 108 in an in-person transaction or the consumer 104 for an e-commerce or remote transaction as may be identified by the merchant system 108), transaction date, transaction amount, currency type, merchant identification number, merchant category code, product data, acquirer data, issuer data, reward data, offer data, loyalty data, etc. The transaction message may also include a message type indicator indicative of a type of the payment transaction. When the transaction message is submitted to the payment network 110 for authorization, the transaction message may be an authorization request, such as may be indicated by the message type indicator therein.

The payment network 110 may receive the transaction message and perform any value added services in relation thereto (e.g., fraud scoring, controlled payment number mapping, application of transaction controls, etc.). The payment network 110 may then forward the authorization request to the processing server 102. In some embodiments, the processing server 102 may be a part of the payment network 110 and receive the authorization request via internal networking and communication thereof. In other embodiments, the processing server 102 may be a part of the issuing institution 106, where the payment network 110 may electronically transmit the transaction message to the issuing institution 106 using payment rails thereof as part of standard transaction processing, where the processing server 102 may perform the functions discussed herein as part of the processing performed by the issuing institution 106. In yet other embodiments, the processing server 102 may be external to both the payment network 110 and issuing institution 106 and receive the authorization request for performing of the functions discussed herein prior to the authorization request being forwarded to the issuing institution 106 for processing.

The processing server 102 may receive the authorization request and identify an account profile of the consumer 104 involved in the payment transaction through the transaction account used to fund the attempted payment transaction via the account identifier included in the transaction data. The processing server 102 may then identify each of the user devices 112 registered to the transaction account (e.g., as stored in the account profile) and identify the most recent geographic location of each of the user devices 112. In some embodiments, the processing server 102 may identify the geographic location of each user device 112 after receipt of the authorization request. In other embodiments, the geographic location of each user device 112 may be obtained at periodic intervals, where the most recently obtained geographic location of each user device 112 may be used.

In some embodiments, the processing server 102 may directly identify the geographic location of each user device 112. For instance, the user devices 112 may, as part of the registration process, be configured to periodically report its geographic location to the processing server 102 using a suitable communication network and method. In other cases, the processing server 102 may periodically request the current geographic location of each user device 112 from the respective user device 112, where the respective user device 112 may identify its geographic location and transmit it to the processing server 102 using a suitable communication network and method. In other embodiments, the system 100 may include a location provider 114. The location provider 114 may be a third party entity configured to identify the geographic location of user devices 112 for reporting thereof to the processing server 102. The location provider 114 may be a mobile network operator, device manufacturer, or other entity configured to identify geographic locations of user devices 112. In some cases, the system 100 may include multiple location providers 114, such as in instances where the geographic locations of the user devices 112 registered to a consumer 104 are identified by separate entities. The location provider 114 may provide periodic reporting of identified geographic locations, or may provide the processing server 102 with geographic locations upon request thereby.

The processing server 102 may thus identify the geographic location of a plurality of different user devices 112 registered to the transaction account, which may be directly stored in the account profile or identified based on data included therein. The processing server 102 may then identify an authentication score for the attempted payment transaction. The authentication score may be based on at least a comparison of the geographic location and transaction time in the authorization request to the most recent geographic location and a timestamp of when that geographic location was identified for each of the user devices 112. The geographic location and timestamp of at least two user devices 112 may be used, where in some cases it must be at least two user devices 112 not used as a payment instrument in the attempted payment transaction. In some cases, the geographic locations and timestamps may be weighted, such as based on an amount of time elapsed between the timestamp and the transaction time. For example, if the timestamp for the geographic location of a smart phone is from fifteen minutes before the transaction time while the timestamp for the geographic location of an activity tracker is from two minutes before the transaction time, the geographic location of the activity tracker may be given greater weight in identifying the authentication score.

The authentication score may be a measure of the trustworthiness of the transaction (e.g., likelihood of fraud being perpetrated). In cases where geographic locations for the user devices 112 are all located in close proximity to the geographic location of the transaction the authentication score may be very high (e.g., or very low, as applicable depending on implementation). In some instances, if the geographic location of a single user device 112 is outside of a predetermined distance of the geographic location of the payment transaction, the authorization score may be very low (e.g., or very high, as applicable) as a result. In some such instances, a predetermined value may be used for the authorization score. The predetermined distance may be set by the processing server 102 or issuing institution 106 that issued the transaction account used in the attempted payment transaction. In some instances, the predetermined distance may be based on time elapsed between the timestamp and the transaction time. For instance, the predetermined distance may be the maximum distance that may be traveled by the consumer 104 during the elapsed time, which may vary based on the geographic location of the payment transaction (e.g., the predetermined distance for a shop located inside of an indoor shopping mall may be shorter than the predetermined distance for a gas station along an interstate highway).

Once the authentication score has been identified, the processing server 102 may electronically transmit the authentication score and authorization request to the issuing institution 106 for processing. In some cases, the authentication score may be included in a data element of the authorization request. In other cases, the authentication score may accompany the authorization request in an electronic transmission, or be transmitted separately from the authorization request. In latter instances, the authorization request may be electronically transmitted using payment rails, while the authentication score may be transmitted via a separate communication network and method. In some embodiments, the processing server 102 may provide the authentication score to the payment network 110, which may forward the authentication score and authorization request to the issuing institution 106. The issuing institution 106 may then determine whether to approve or decline the payment transaction using the authentication score in addition to other criteria used in standard payment transaction processing. In some embodiments, the issuing institution 106 may decline any payment transaction where the authentication score is below (e.g., or above, as applicable depending on implementation) a predetermined threshold value. The issuing institution 106 may provide an authorization response (e.g., a transaction message indicated accordingly by its message type indicator) to the payment network 110 that includes a response code in a data element included therein indicating approval or decline of the payment transaction, which may be processed accordingly by the payment network 110 using traditional methods. In some cases, the authorization response may be transmitted to the processing server 102 for forwarding to the payment network 110. The payment network 110 and merchant system 108 may then finalize the payment transaction using traditional methods.

In some embodiments, the processing server 102 may be configured to perform on-behalf processing of the issuing institution 106. In such embodiments, the processing server 102 may be configured to decline payment transactions when the authentication score is below the predetermined threshold value. In such an embodiment, if the authentication score is below the threshold value, the processing server 102 may generate an authorization response for the payment transaction that includes a response code indicating decline of the payment transaction (e.g., which may further indicate potential fraud as the reason), which may be electronically transmitted to the payment network 110 via payment rails associated therewith. In such a case, the issuing institution 106 may not be required to perform any functions related to the processing of the payment transaction. In some instances, the processing server 102 may inform the issuing institution 106 of the attempted fraud (e.g., to contact the consumer 104, freeze the transaction account, etc.). If the authentication score is above the predetermined threshold value, the processing server 102 may provide the authorization request and authentication score to the issuing institution 106 as discussed above.

Figure 1B:
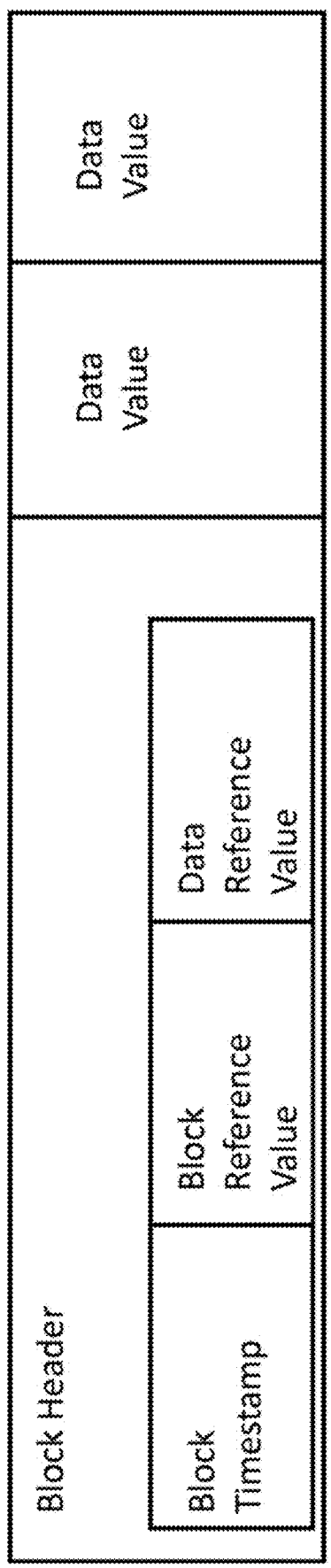
FIG. 1B is a block diagram illustrating a format of each block in a blockchain in accordance with exemplary embodiments.

In some embodiments, the geographic location identified for user devices 112 may be stored in a blockchain. The blockchain may be stored in and managed by a plurality of nodes comprising a blockchain network 116. Each of the nodes may be a computing system configured to generate blockchain data values, generate new blocks, validate new blocks, and maintain a copy of the blockchain. The blockchain may be a distributed ledger that is comprised of at least a plurality of blocks. As shown in FIG. 1B, each block may include at least a block header and one or more data values. Each block header may include at least a timestamp, a block reference value, and a data reference value. The timestamp may be a time at which the block header was generated, and may be represented using any suitable method (e.g., UNIX timestamp, DateTime, etc.). The block reference value may be a value that references an earlier block (e.g., based on timestamp) in the blockchain. In some embodiments, a block reference value in a block header may be a reference to the block header of the most recently added block prior to the respective block. In an exemplary embodiment, the block reference value may be a hash value generated via the hashing of the block header of the most recently added block. The data reference value may similarly be a reference to the one or more data values stored in the block that includes the block header. In an exemplary embodiment, the data reference value may be a hash value generated via the hashing of the one or more data values. For instance, the block reference value may be the root of a Merkle tree generated using the one or more data values.

The use of the block reference value and data reference value in each block header may result in the blockchain being immutable. Any attempted modification to a data value would require the generation of a new data reference value for that block, which would thereby require the subsequent block's block reference value to be newly generated, further requiring the generation of a new block reference value in every subsequent block. This would have to be performed and updated in every single node in the blockchain network 116 prior to the generation and addition of a new block to the blockchain in order for the change to be made permanent. Computational and communication limitations may make such a modification exceedingly difficult, if not impossible, thus rendering the blockchain immutable.

Data values included in the blockchain, also referred to herein as blockchain data values, may each include at least a geographic location of a user device 112 and the device identifier unique thereto. In some cases, a blockchain data value may also include the timestamp for when the geographic location was identified. In other cases, the timestamp in the block header of the block that includes the blockchain data value may serve as the timestamp for that geographic location. In some embodiments, location providers 114 may provide geographic locations to nodes in the blockchain network 116 for creation of new blockchain data values. In other embodiments, the processing server 102 may provide geographic locations to the blockchain network 116, such as may be received directly from user devices 112, obtained from location providers 114, or a combination thereof. In some instances, the processing server 102 may be a node in the blockchain network 116 and may be configured to generate blockchain data values and new blocks for validation by other nodes using traditional methods and systems. In some embodiments, each blockchain data value may also include the account identifier to which the respective user device 112 is associated or other data indicative thereof (e.g., as may be stored in the respective account profile).

The methods and systems discussed herein provide for greater fraud prevention through the contextual authentication of electronic payment transactions based on the geographic location of multiple user devices 112. The use of multiple user devices 112 ensures that a consumer's transaction account is not compromised if one user device is lost or stolen, particularly in instances where a user device 112 may itself serve as the payment instrument. The use of an authentication score rather than direct approve or decline of a payment transaction can also provide for greater flexibility with respect to both habits of the consumer 104 (e.g., if one user device 112 is left at home) as well as reporting of the geographic location of the user devices 112 (e.g., a longer reporting periodic interval may be used, reducing network traffic and device energy consumption). In embodiments where a blockchain is used for geographic location storage, security is even greater as geographic location information cannot be modified or falsified, preventing other avenues of attack by fraudsters with the added benefit of protecting merchant systems 108 if a consumer 108 attempts to contest a genuine transaction. The result is a system with greater security against fraud while not sacrificing consumer convenience.

Processing Server

Figure 2:
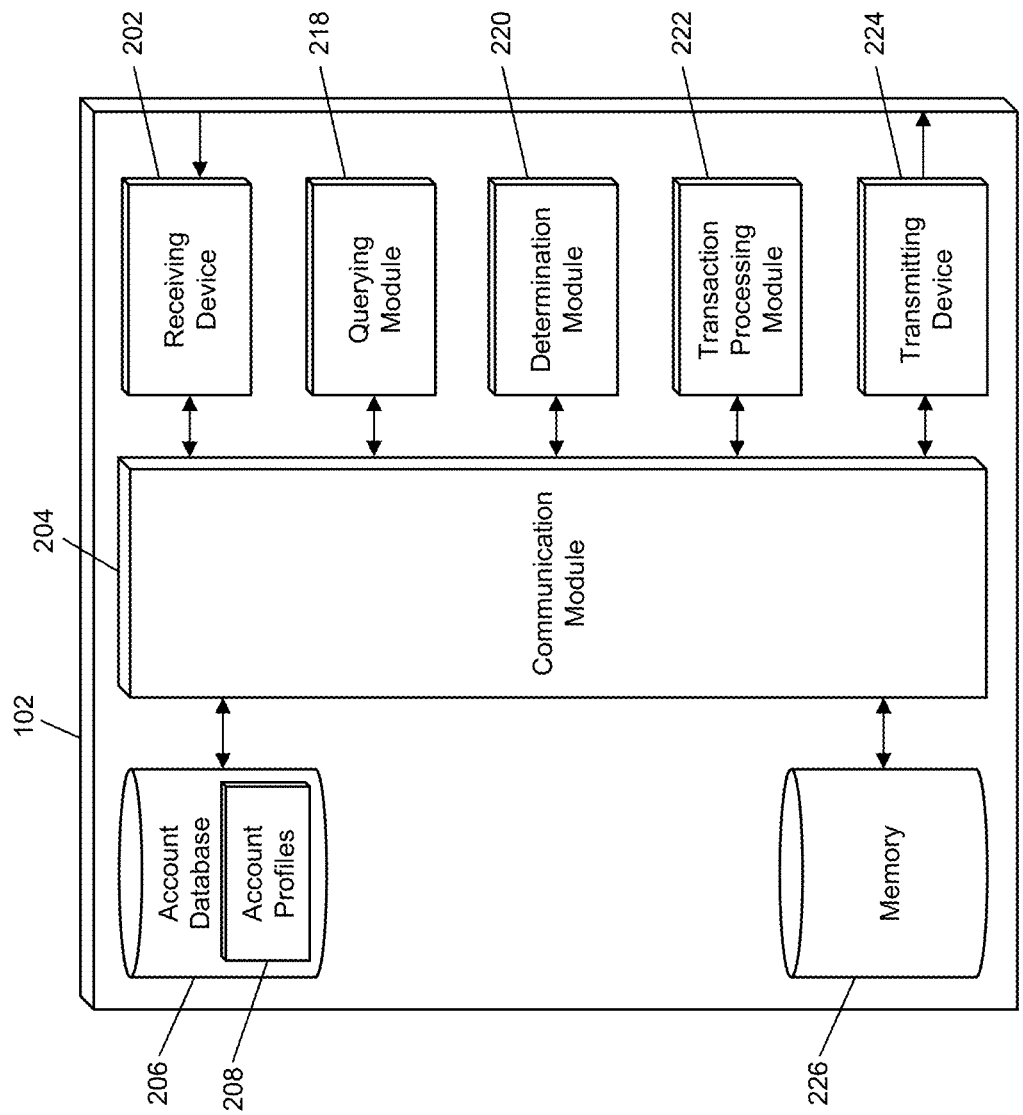
FIG. 2 is a block diagram illustrating the processing server of the system of FIG. 1 for contextual authentication of payment transactions based on computing device geolocation in accordance with exemplary embodiments.

FIG. 2 illustrates an embodiment of a processing server 102 in the system 100. It will be apparent to persons having skill in the relevant art that the embodiment of the processing server 102 illustrated in FIG. 2 is provided as illustration only and may not be exhaustive to all possible configurations of the processing server 102 suitable for performing the functions as discussed herein. For example, the computer system 500 illustrated in FIG. 5 and discussed in more detail below may be a suitable configuration of the processing server 102.

The processing server 102 may include a receiving device 202. The receiving device 202 may be configured to receive data over one or more networks via one or more network protocols. In some instances, the receiving device 202 may be configured to receive data from issuing institutions 106, payment networks 110, user devices 112, location providers 114, blockchain networks 116, and other systems and entities via one or more communication methods, such as radio frequency, local area networks, wireless area networks, cellular communication networks, Bluetooth, the Internet, etc. In some embodiments, the receiving device 202 may be comprised of multiple devices, such as different receiving devices for receiving data over different networks, such as a first receiving device for receiving data over a local area network and a second receiving device for receiving data via the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by issuing institutions 106 and/or user devices 112 that may be superimposed or otherwise encoded with registration data, such as may include an account identifier and device identifiers for a plurality of user devices 112. The receiving device 202 may also be configured to receive data signals electronically transmitted by payment networks 110 and issuing institutions 106 that may be superimposed or otherwise encoded with transaction messages, including authorization requests and responses, which may be transmitted via payment rails associated with the payment network 110. The receiving device 202 may be further configured to receive data signals electronically transmitted by user devices 112 and location providers 114 that are superimposed or otherwise encoded with geolocation data, which may include a device identifier, geographic location of the associated user device 112, and a timestamp when the geographic location was identified. In some embodiments, the receiving device 202 may also be configured to receive data signals electronically transmitted by nodes in the blockchain network 116, such as may be superimposed or otherwise encoded with new blockchain data values, new blocks for validation, or blocks that have been validated and added to the blockchain.

The processing server 102 may also include a communication module 204. The communication module 204 may be configured to transmit data between modules, engines, databases, memories, and other components of the processing server 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the processing server 102 and external components of the processing server 102, such as externally connected databases, display devices, input devices, etc. The processing server 102 may also include a processing device. The processing device may be configured to perform the functions of the processing server 102 discussed herein as will be apparent to persons having skill in the relevant art. In some embodiments, the processing device may include and/or be comprised of a plurality of engines and/or modules specially configured to perform one or more functions of the processing device, such as a querying module 218, determination module 220, transaction processing module 222, etc. As used herein, the term "module" may be software or hardware particularly programmed to receive an input, perform one or more processes using the input, and provides an output. The input, output, and processes performed by various modules will be apparent to one skilled in the art based upon the present disclosure.

The processing server 102 may include an account database 206. The account database 206 may be configured to store a plurality of account profiles 208 using a suitable data storage format and schema. The account database 206 may be a relational database that utilizes structured query language for the storage, identification, modifying, updating, accessing, etc. of structured data sets stored therein. Each account profile 208 may be a structured data set configured to store data related to a transaction account including at least an account identifier and information associated with a plurality of user devices 112. The information may include device identifiers for each of the user devices 112 and may also include geographic location data, such as at least the most recent geographic location and accompanying timestamp for the respective user device 112.

The processing server 102 may include a querying module 218. The querying module 218 may be configured to execute queries on databases to identify information. The querying module 218 may receive one or more data values or query strings, and may execute a query string based thereon on an indicated database, such as the account database 206, to identify information stored therein. The querying module 218 may then output the identified information to an appropriate engine or module of the processing server 102 as necessary. The querying module 218 may, for example, execute a query on the account database 206 to identify the most recent geographic location and timestamp for each of the user devices 112 stored in an account profile 208 as identified using the account identifier included in a received authorization request.

The processing server 102 may also include a determination module 220. The determination module 220 may be configured to make determinations for the processing server 102 as part of the functions thereof discussed herein. The determination module 220 may receive instructions as input, may make determinations as instructed, and may output results of the determinations to other modules or engines of the processing server 102. In some cases, the instructions may include data to be used by the determination module 220 in making the determinations. In other cases, the determination module 220 may identify (e.g., via instructing the querying module 218) data to be used in a determination. The determination module 220 may be configured to, for instance, identify an authentication score for a payment transaction based on at least a comparison of the geographic location and transaction time of the transaction (e.g., as identified in the authorization request) to the geographic location and timestamp for each of the plurality of user devices 112 identified (e.g., via the querying module 218) for the transaction.

The processing server 102 may also include a transaction processing module 222. The transaction processing module 222 may be configured to perform functions associated with the processing of electronic payment transactions. Such functions may include, for example, the routing of transaction messages, generation of authorization responses, modification of data elements, and value added services that may be performed by a payment network 110 or for an issuing institution 106, such as fraud scoring, controlled payment number mapping, application of transaction controls, etc. The transaction processing module 222 may also be configured to perform on-behalf processing for an issuing institution 106, such as by declining payment transactions if an authentication score is below a predetermined threshold value, where decline of the payment transaction may include generation of an authorization response that includes a data element that stores a response code indicating decline of the payment transaction that is routed to the payment network 110 via payment rails associated therewith.

The processing server 102 may also include a transmitting device 224. The transmitting device 224 may be configured to transmit data over one or more networks via one or more network protocols. In some instances, the transmitting device 224 may be configured to transmit data to issuing institutions 106, payment networks 110, user devices 112, location providers 114, blockchain networks 116, and other entities via one or more communication methods, local area networks, wireless area networks, cellular communication, Bluetooth, radio frequency, the Internet, etc. In some embodiments, the transmitting device 224 may be comprised of multiple devices, such as different transmitting devices for transmitting data over different networks, such as a first transmitting device for transmitting data over a local area network and a second transmitting device for transmitting data via the Internet. The transmitting device 224 may electronically transmit data signals that have data superimposed that may be parsed by a receiving computing device. In some instances, the transmitting device 224 may include one or more modules for superimposing, encoding, or otherwise formatting data into data signals suitable for transmission.

The transmitting device 224 may be configured to electronically transmit data signals to issuing institutions 106 and user devices 112 that are superimposed or otherwise encoded with requests for registration data. The transmitting device 224 may also be configured to electronically transmit data signals to payment networks and issuing institutions 106 that are superimposed or otherwise encoded with transaction messages, including authorization requests and responses, which may be transmitted via payment rails associated with the payment network 110. The transmitting device 224 may be further configured to electronically transmit data signals to user devices 112 and location providers 114, which may be superimposed or otherwise encoded with requests for geographic location data, which may include device identifiers for the user devices 112 for which geographic locations are requested. In some embodiments, the transmitting device 224 may also be configured to electronically transmit data signals to nodes in the blockchain network 116, which may include data for inclusion in a new data value or may include data values, block headers, or blocks themselves for validation and/or inclusion in the blockchain, or may include requests for new blockchain data values or blocks.

The processing server 102 may also include a memory 226. The memory 226 may be configured to store data for use by the processing server 102 in performing the functions discussed herein, such as public and private keys, symmetric keys, etc. The memory 226 may be configured to store data using suitable data formatting methods and schema and may be any suitable type of memory, such as read-only memory, random access memory, etc. The memory 226 may include, for example, encryption keys and algorithms, communication protocols and standards, data formatting standards and protocols, program code for modules and application programs of the processing device, and other data that may be suitable for use by the processing server 102 in the performance of the functions disclosed herein as will be apparent to persons having skill in the relevant art. In some embodiments, the memory 226 may be comprised of or may otherwise include a relational database that utilizes structured query language for the storage, identification, modifying, updating, accessing, etc. of structured data sets stored therein. The memory 226 may be configured to store, for example, blockchain data, hashing algorithms for generating blocks, credentials for validation, usage rule templates, communication data for blockchain nodes, authentication scoring algorithms, predetermined threshold values, periodic interval timings, predetermined distances, etc.

Process for Contextual Device-Based Authentication

Figure 3:
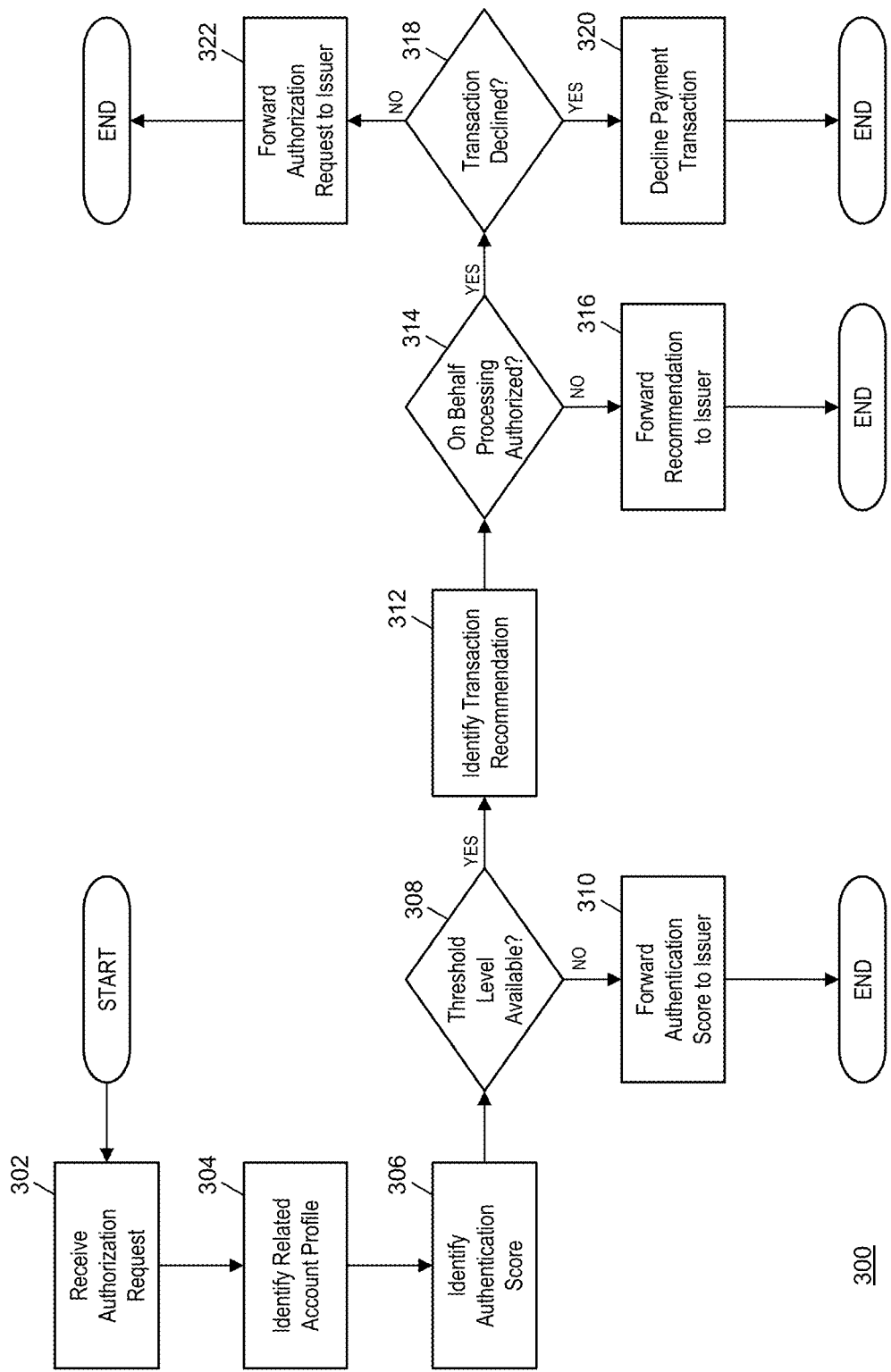
FIG. 3 is a flow diagram illustrating a process for the processing of a payment transaction using contextual device-based authentication by the processing server of FIG. 2 in accordance with exemplary embodiments.

FIG. 3 illustrates an example process 300 executed by the processing server 102 of FIG. 2 in the system 100 for the contextual authentication of an electronic payment transaction based on user device 112 geographic locations that includes on-behalf processing of the issuing institution 106.

In step 302, the receiving device 202 of the processing server 102 may receive an authorization request for an electronic payment transaction from the payment network 110, which may be transmitted via payment rails associated therewith. The authorization request may be formatted according to one or more standards and include a plurality of data elements configured to store transaction data including at least an account identifier, a transaction geographic location, and a transaction time. In step 304, the querying module 218 of the processing server 102 may execute a query on the account database 206 of the processing server 102 to identify an account profile 208 stored therein that includes the account identifier included in the authorization request. In step 306, the determination module 220 of the processing server 102 may be configured to identify an authentication score for the electronic payment transaction based on a comparison of the transaction geographic location and transaction time to a device geographic location and accompanying timestamp for each of a plurality of user devices 112 as stored in the identified account profile 208. In some cases, only user devices 112 not used as the payment instrument for the electronic payment transaction (e.g., as may be identified using data stored in the authorization request) may be used in step 306.

In step 308, the processing server 102 may identify if a threshold value has been provided by the issuing institution 106 that issued the transaction account used in the payment transaction, such as may be stored in the identified account profile 208 or in a memory 226 of the processing server 102. If no threshold value is available, then, in step 310, the transmitting device 224 of the processing server 102 may electronically transmit the identified authentication score to the issuing institution 106 using a suitable communication network and method, which may be the payment rails associated with the payment network 110. In some cases, the authentication score may be included in or may otherwise accompany the authorization request, which may also be forwarded to the issuing institution 106.

If a threshold value is available, then, in step 312, the determination module 220 of the processing server 102 may determine a recommendation of approval or decline of the payment transaction, at least with respect to the likelihood of fraud determined by the authentication score. The determination may be based on if the authentication score exceeds the threshold value or not. In step 314, the processing server 102 may determine if the issuing institution 106 has authorized the processing server 102 to perform on behalf processing, which may be identified based on data stored in the memory 226 of the processing server 102. If no on behalf processing is authorized, then, in step 316, the transmitting device 224 of the processing server 102 may electronically transmit the identified recommendation to the issuing institution 106 using a suitable communication network and method, which may be the payment rails associated with the payment network 110. In some cases, the recommendation may be included in or may otherwise accompany the authorization request, which may also be forwarded to the issuing institution 106. In some instances, the authentication score may be electronically transmitted with the recommendation.

If on behalf processing is authorized by the issuing institution 106, then, in step 318, the transaction processing module 222 or determination module 220 of the processing server 102 may determine if that transaction should be declined based on the recommendation identified in step 312. If the transaction is to be declined, then, in step 320, the transaction processing module 222 of the processing server 102 may generate an authorization response that includes a data element configured to store a response code that indicates decline of the payment transaction, which may be electronically transmitted to the payment network 110 by the transmitting device 224 of the processing server 102 using payment rails associated therewith, for further processing by the payment network 110. If the transaction is not to be declined, then, in step 322, the transmitting device 224 of the processing server 102 may electronically transmit the authorization request to the issuing institution 106 using a suitable communication network and method, which may be the payment rails associated with the payment network 110. In some instances, the authorization score and/or recommendation may be included in or otherwise accompany the authorization request.

Exemplary Method for Contextual Authentication Based on Computing Devices

Figure 4:
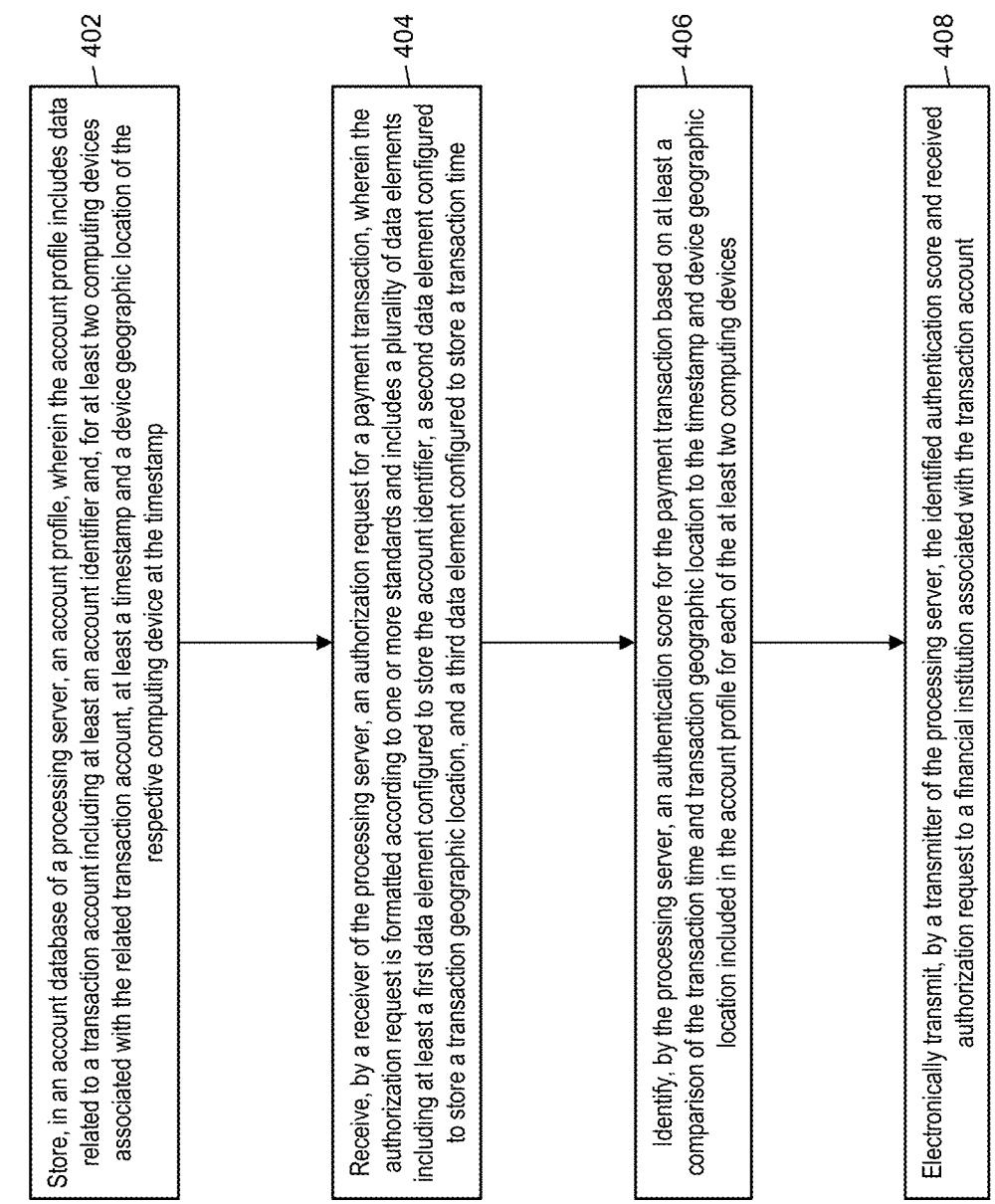
FIG. 4 is a flow chart illustrating an exemplary method for contextual authentication based on computing devices in accordance with exemplary embodiments.

FIG. 4 illustrates a method 400 for the contextual authentication of an electronic payment transaction based on the geographic location of a plurality of computing device associated with a transaction account used to fund the attempted payment transaction.

In step 402, an account profile (e.g., account profile 208) may be stored in an account database (e.g., the account database 206) of a processing server (e.g., the processing server 102), wherein the account profile includes data related to a transaction account including at least an account identifier and, for at least two computing devices (e.g., user devices 112) associated with the related transaction account, at least a timestamp and a device geographic location of the respective computing device at the timestamp. In step 404, an authorization request for a payment transaction may be received by a receiver (e.g., the receiving device 202) of the processing server, wherein the authorization request is formatted according to one or more standards and includes a plurality of data elements including at least a first data element configured to store the account identifier, a second data element configured to store a transaction geographic location, and a third data element configured to store a transaction time.

In step 406, an authentication score may be identified for the payment transaction by the processing server based on at least a comparison of the transaction time and transaction geographic location to the timestamp and device geographic location included in the account profile for each of the at least two computing devices. In step 408, the identified authentication score and received authorization request may be electronically transmitted by a transmitter (e.g., the transmitting device 224) of the processing server to a financial institution (e.g., the issuing institution 106) associated with the transaction account.

In one embodiment, the account profile may be a blockchain comprised of a plurality of blocks, each block including at least a block header and one or more data values, where each block header includes at least a block timestamp, a block reference value, and a data reference value, wherein the device geographic location for each of the at least two computing devices is included in one of the one or more data values included in one of the plurality of blocks, and the timestamp for each of the at least two computing devices is the block timestamp included in the block header of the one of the plurality of blocks that includes the one of the one or more data values. In some embodiments, the identified authentication score may be stored in a fourth data element of the authorization request prior to the electronic transmission. In one embodiment, the method 400 may also include determining, by the processing server, if the payment transaction should be approved or declined based on comparison of the identified authentication score to a threshold value, wherein the determination is stored in a fourth data element of the authorization request prior to the electronic transmission.

In some embodiments, the method 400 may further include determining, by the processing server, if the payment transaction should be declined based on a comparison of the identified authentication score to a threshold level, where step 408 is conducted if the determination is unsuccessful, where, if the determination is unsuccessful, the processing server alternatively electronically transmits an authorization response for the payment transaction to a third party (e.g., the payment network 110), wherein the authorization response is formatted according to the one or more standards and includes a plurality of data elements including at least a first data element configured to store the account identifier and a second data element configured to store a response code indicating decline of the payment transaction.

In a further embodiment, the account profile may be a blockchain comprised of a plurality of blocks, each block including at least a block header and one or more data values, where each block header includes at least a block timestamp, a block reference value, and a data reference value, wherein the device geographic location for each of the at least two computing devices is included in one of the one or more data values included in one of the plurality of blocks, and the timestamp for each of the at least two computing devices is the block timestamp included in the block header of the one of the plurality of blocks that includes the one of the one or more data values. In another further embodiment, if the determination is unsuccessful the identified authentication score may be stored in a fourth data element of the authorization request prior to the electronic transmission. In yet another embodiment, the authentication score may be further based on a number of the at least two computing devices.

Computer System Architecture

Figure 5:
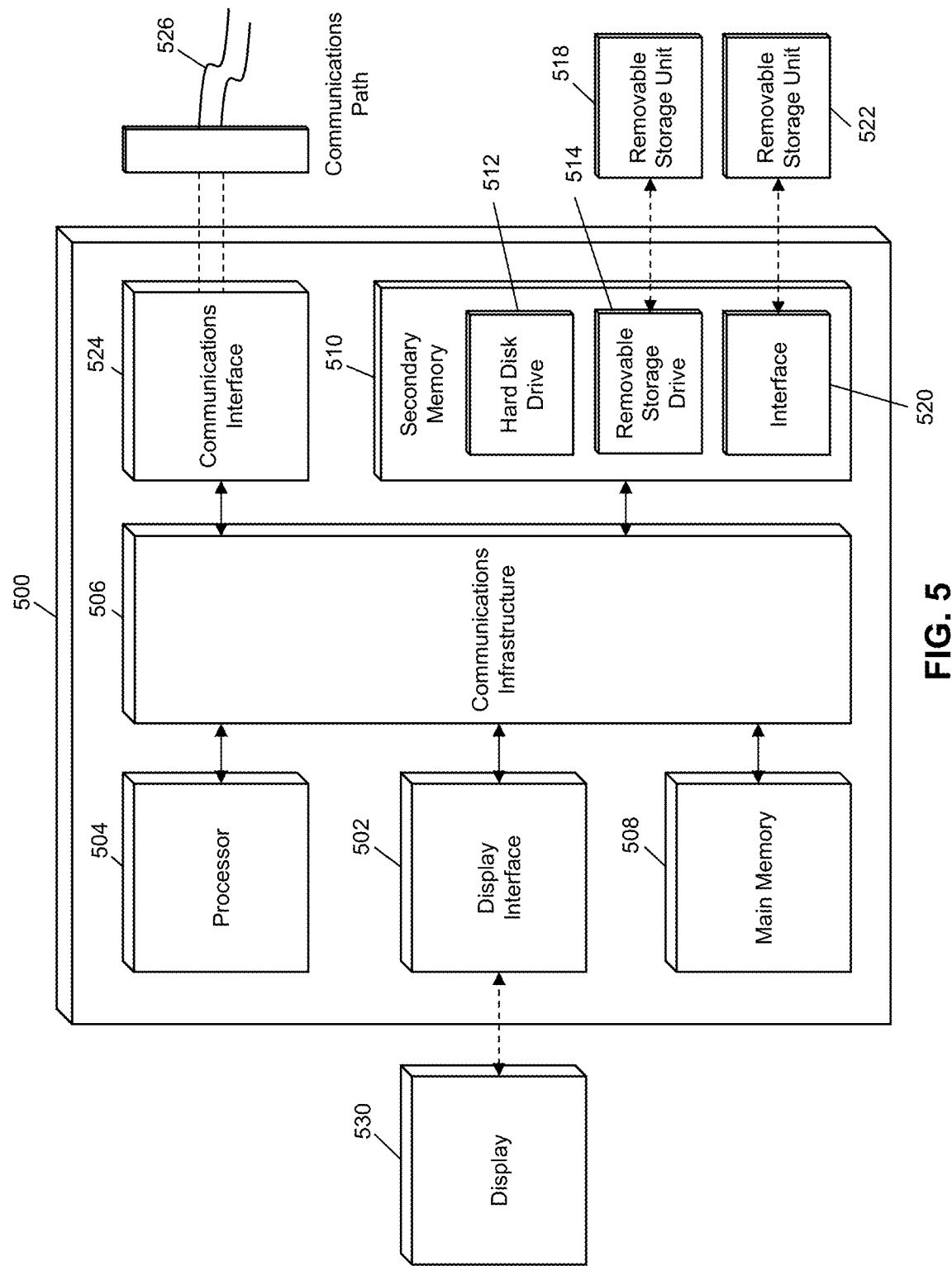
FIG. 5 is a block diagram illustrating a computer system architecture in accordance with exemplary embodiments.

FIG. 5 illustrates a computer system 500 in which embodiments of the present disclosure, or portions thereof, may be implemented as computer-readable code. For example, the processing server 102 of FIG. 1 may be implemented in the computer system 500 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3 and 4.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 518, a removable storage unit 522, and a hard disk installed in hard disk drive 512.

Various embodiments of the present disclosure are described in terms of this example computer system 500. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 504 may be a special purpose or a general purpose processor device specifically configured to perform the functions discussed herein. The processor device 504 may be connected to a communications infrastructure 506, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 500 may also include a main memory 508 (e.g., random access memory, read-only memory, etc.), and may also include a secondary memory 510. The secondary memory 510 may include the hard disk drive 512 and a removable storage drive 514, such as a floppy disk drive, a magnetic tape drive, an optical disk drive, a flash memory, etc.

The removable storage drive 514 may read from and/or write to the removable storage unit 518 in a well-known manner. The removable storage unit 518 may include a removable storage media that may be read by and written to by the removable storage drive 514. For example, if the removable storage drive 514 is a floppy disk drive or universal serial bus port, the removable storage unit 518 may be a floppy disk or portable flash drive, respectively. In one embodiment, the removable storage unit 518 may be non-transitory computer readable recording media.

In some embodiments, the secondary memory 510 may include alternative means for allowing computer programs or other instructions to be loaded into the computer system 500, for example, the removable storage unit 522 and an interface 520. Examples of such means may include a program cartridge and cartridge interface (e.g., as found in video game systems), a removable memory chip (e.g., EEPROM, PROM, etc.) and associated socket, and other removable storage units 522 and interfaces 520 as will be apparent to persons having skill in the relevant art.

Data stored in the computer system 500 (e.g., in the main memory 508 and/or the secondary memory 510) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 500 may also include a communications interface 524. The communications interface 524 may be configured to allow software and data to be transferred between the computer system 500 and external devices. Exemplary communications interfaces 524 may include a modem, a network interface (e.g., an Ethernet card), a communications port, a PCMCIA slot and card, etc. Software and data transferred via the communications interface 524 may be in the form of signals, which may be electronic, electromagnetic, optical, or other signals as will be apparent to persons having skill in the relevant art. The signals may travel via a communications path 526, which may be configured to carry the signals and may be implemented using wire, cable, fiber optics, a phone line, a cellular phone link, a radio frequency link, etc.

The computer system 500 may further include a display interface 502. The display interface 502 may be configured to allow data to be transferred between the computer system 500 and external display 530. Exemplary display interfaces 502 may include high-definition multimedia interface (HDMI), digital visual interface (DVI), video graphics array (VGA), etc. The display 530 may be any suitable type of display for displaying data transmitted via the display interface 502 of the computer system 500, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 508 and secondary memory 510, which may be memory semiconductors (e.g., DRAMs, etc.). These computer program products may be means for providing software to the computer system 500. Computer programs (e.g., computer control logic) may be stored in the main memory 508 and/or the secondary memory 510. Computer programs may also be received via the communications interface 524. Such computer programs, when executed, may enable computer system 500 to implement the present methods as discussed herein. In particular, the computer programs, when executed, may enable processor device 504 to implement the methods illustrated by FIGS. 3 and 4, as discussed herein. Accordingly, such computer programs may represent controllers of the computer system 500. Where the present disclosure is implemented using software, the software may be stored in a computer program product and loaded into the computer system 500 using the removable storage drive 514, interface 520, and hard disk drive 512, or communications interface 524.

The processor device 504 may comprise one or more modules or engines configured to perform the functions of the computer system 500. Each of the modules or engines may be implemented using hardware and, in some instances, may also utilize software, such as corresponding to program code and/or programs stored in the main memory 508 or secondary memory 510. In such instances, program code may be compiled by the processor device 504 (e.g., by a compiling module or engine) prior to execution by the hardware of the computer system 500. For example, the program code may be source code written in a programming language that is translated into a lower level language, such as assembly language or machine code, for execution by the processor device 504 and/or any additional hardware components of the computer system 500. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 500 to perform the functions disclosed herein. It will be apparent to persons having skill in the relevant art that such processes result in the computer system 500 being a specially configured computer system 500 uniquely programmed to perform the functions discussed above.

Techniques consistent with the present disclosure provide, among other features, systems and methods for contextual authentication based on computing devices. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for contextual authentication based on computing devices, comprising:
    storing, in an account database of a processing server, an account profile, wherein the account profile includes data related to a transaction account including at least an account identifier and, for at least two mobile computing devices associated with the related transaction account, at least a timestamp and a device geographic location of the respective mobile computing device at the timestamp;
    receiving, by a receiver of the processing server, an authorization request for a payment transaction, wherein the authorization request is formatted according to one or more standards and includes a plurality of data elements including at least a first data element configured to store the account identifier, a second data element configured to store a transaction geographic location, and a third data element configured to store a transaction time;
    receiving periodically, by the receiver of the processing server, a current timestamp and a current device geographic location of each mobile computing device in the at least two mobile computing devices of a related account profile;
    updating, in the account database of the processing server, the timestamp and the device geographic location of the respective mobile computing device of the related account profile with the current timestamp and current device geographic location received in association with each mobile computing device in the at least two mobile computing devices of the related account profile;
    identifying, by the processing server, an authentication score for the payment transaction based on at least a comparison of the transaction time and transaction geographic location to the timestamp and device geographic location included in the account profile for each mobile computing device of the at least two mobile computing devices; and
    electronically transmitting, by a transmitter of the processing server, the identified authentication score and received authorization request to a financial institution associated with the transaction account.

2. The method of claim 1, wherein
    the account profile is a blockchain comprised of a plurality of blocks, each block including at least a block header and one or more data values, where each block header includes at least a block timestamp, a block reference value, and a data reference value,
    the device geographic location for each of the at least two mobile computing devices is included in one of the one or more data values included in one of the plurality of blocks, and
    the timestamp for each of the at least two mobile computing devices is the block timestamp included in the block header of the one of the plurality of blocks that includes the one of the one or more data values.

3. The method of claim 1, wherein the identified authentication score is stored in a fourth data element of the authorization request prior to the electronic transmission.

4. The method of claim 1, further comprising:
    determining, by the processing server, if the payment transaction should be approved or declined based on comparison of the identified authentication score to a threshold value, wherein
    the determination is stored in a fourth data element of the authorization request prior to the electronic transmission.

5. A method for contextual authentication based on computing devices, comprising:
    storing, in an account database of a processing server, an account profile, wherein the account profile includes data related to a transaction account including at least an account identifier and, for at least two mobile computing devices associated with the related transaction account, at least a timestamp and a device geographic location of the respective mobile computing device at the timestamp;
    receiving, by a receiver of the processing server, an authorization request for a payment transaction, wherein the authorization request is formatted according to one or more standards and includes a plurality of data elements including at least a first data element configured to store the account identifier, a second data element configured to store a transaction geographic location, and a third data element configured to store a transaction time;
    receiving periodically, by the receiver of the processing server, a current timestamp and a current device geographic location of each mobile computing device in the at least two mobile computing devices of a related account profile;
    updating, in the account database of the processing server, the timestamp and the device geographic location of the respective mobile computing device of the related account profile with the current timestamp and current device geographic location received in association with each mobile computing device in the at least two mobile computing devices of the related account profile;
    identifying, by the processing server, an authentication score for the payment transaction based on at least a comparison of the transaction time and transaction geographic location to the timestamp and device geographic location included in the account profile for each mobile computing device of the at least two mobile computing devices;
    determining, by the processing server, if the payment transaction should be declined based on a comparison of the identified authentication score to a threshold level; and
    if the determination is successful, electronically transmitting, by a transmitter of the processing server, an authorization response for the payment transaction to a third party, wherein the authorization response is formatted according to the one or more standards and includes a plurality of data elements including at least a first data element configured to store the account identifier and a second data element configured to store a response code indicating decline of the payment transaction, or
    if the determination is unsuccessful, electronically transmitting, by the transmitter of the processing server, the identified authentication score and received authorization request to a financial institution associated with the transaction account.

6. The method of claim 5, wherein
the account profile is a blockchain comprised of a plurality of blocks, each block including at least a block header and one or more data values, where each block header includes at least a block timestamp, a block reference value, and a data reference value,
the device geographic location for each of the at least two mobile computing devices is included in one of the one or more data values included in one of the plurality of blocks, and
the timestamp for each of the at least two mobile computing devices is the block timestamp included in the block header of the one of the plurality of blocks that includes the one of the one or more data values.

7. The method of claim 5, wherein, if the determination is unsuccessful, the identified authentication score is stored in a fourth data element of the authorization request prior to the electronic transmission.

8. The method of claim 5, wherein the authentication score is further based on a number of the at least two mobile computing devices.

9. A system for contextual authentication based on computing devices, comprising:
an account database of a processing server configured to store an account profile, wherein the account profile includes data related to a transaction account including at least an account identifier and, for at least two mobile computing devices associated with the related transaction account, at least a timestamp and a device geographic location of the respective mobile computing device at the timestamp;
a receiver of the processing server configured to receive an authorization request for a payment transaction, wherein the authorization request is formatted according to one or more standards and includes a plurality of data elements including at least a first data element configured to store the account identifier, a second data element configured to store a transaction geographic location, and a third data element configured to store a transaction time;
the receiver being configured to receive periodically, a current timestamp and a current device geographic location of each mobile computing device in the at least two mobile computing devices of a related account profile,
the processing server being configured to update in the account database, the timestamp and the device geographic location of each mobile computing device of a related account profile with the current timestamp and current device geographic location received in association with each mobile computing device in the at least two mobile computing devices of the related account profile,
the processing server configured to identify an authentication score for the payment transaction based on at least a comparison of the transaction time and transaction geographic location to the timestamp and device geographic location included in the account profile for each mobile computing device of the at least two mobile computing devices; and
a transmitter of the processing server configured to electronically transmit the identified authentication score and received authorization request to a financial institution associated with the transaction account.

10. The system of claim 9, wherein
the account profile is a blockchain comprised of a plurality of blocks, each block including at least a block header and one or more data values, where each block header includes at least a block timestamp, a block reference value, and a data reference value,
the device geographic location for each of the at least two mobile computing devices is included in one of the one or more data values included in one of the plurality of blocks, and
the timestamp for each of the at least two mobile computing devices is the block timestamp included in the block header of the one of the plurality of blocks that includes the one of the one or more data values.

11. The system of claim 9, wherein the identified authentication score is stored in a fourth data element of the authorization request prior to the electronic transmission.

12. The system of claim 9, wherein
the processing server is further configured to determine if the payment transaction should be approved or declined based on comparison of the identified authentication score to a threshold value, and
the determination is stored in a fourth data element of the authorization request prior to the electronic transmission.

13. A system for contextual authentication based on computing devices, comprising:
an account database of a processing server configured to store an account profile, wherein the account profile includes data related to a transaction account including at least an account identifier and, for at least two mobile computing devices associated with the related transaction account, at least a timestamp and a device geographic location of the respective mobile computing device at the timestamp;
a receiver of the processing server configured to:
receive an authorization request for a payment transaction, wherein the authorization request is formatted according to one or more standards and includes a plurality of data elements including at least a first data element configured to store the account identifier, a second data element configured to store a transaction geographic location, and a third data element configured to store a transaction time; and
receive periodically, a current timestamp and a current device geographic location of each mobile computing device in the at least two mobile computing devices of a related account profile;
the processing server configured to:
update, in the account database, the timestamp and the device geographic location of each mobile computing device in the related account profile with the current timestamp and current device geographic location received in association with each mobile computing device in the at least two mobile computing devices of the related account profile,
identify an authentication score for the payment transaction based on at least a comparison of the transaction time and transaction geographic location to the timestamp and device geographic location included in the account profile for each mobile computing device of the at least two mobile computing devices, and
determine if the payment transaction should be declined based on a comparison of the identified authentication score to a threshold level; and
a transmitter of the processing server configured to:
if the determination is successful, electronically transmit an authorization response for the payment transaction to a third party, wherein the authorization response is formatted according to the one or more standards and includes a plurality of data elements including at least a first data element configured to store the account identifier and a second data element configured to store a response code indicating decline of the payment transaction, or if the determination is unsuccessful, electronically transmit the identified authentication score and received authorization request to a financial institution associated with the transaction account.

14. The system of claim 13, wherein the account profile is a blockchain comprised of a plurality of blocks, each block including at least a block header and one or more data values, where each block header includes at least a block timestamp, a block reference value, and a data reference value, the device geographic location for each of the at least two mobile computing devices is included in one of the one or more data values included in one of the plurality of blocks, and the timestamp for each of the at least two computing devices is the block timestamp included in the block header of the one of the plurality of blocks that includes the one of the one or more data values.

15. The system of claim 13, wherein, if the determination is unsuccessful, the identified authentication score is stored in a fourth data element of the authorization request prior to the electronic transmission.

16. The system of claim 13, wherein the authentication score is further based on a number of the at least two mobile computing devices.

\* \* \* \* \*